United States Patent [19]

Land

[11] 4,184,745

[45] Jan. 22, 1980

[54] TRANSLUCENT SCREEN

[75] Inventor: Edwin H. Land, Cambridge, Mass.

[73] Assignee: Polaroid Corporation, Cambridge, Mass.

[21] Appl. No.: 884,706

[22] Filed: Mar. 8, 1978

[51] Int. Cl.² .................... G03B 21/60; C08L 3/00; C09D 3/20; C09J 3/06
[52] U.S. Cl. .................................. 350/126; 106/210; 264/113

[58] Field of Search ............... 350/117, 126; 106/210, 106/213, 203, 204, 169; 264/131, 113

[56] References Cited

U.S. PATENT DOCUMENTS 3,609,000  9/1971  Miyano et al. ..................... 350/126

Primary Examiner—Richard A. Wintercorn
Attorney, Agent, or Firm—Stanley H. Mervis

[57] ABSTRACT

Translucent screens are provided comprising a dispersion of starch particles in a continuous polymeric phase.

12 Claims, No Drawings

TRANSLUCENT SCREEN

This invention relates to new and improved translucent screens.

An object of this invention is to provide a translucent screen showing little or no scintillation, having substantially no grain, showing substantially no hot spot or area of excessive brilliance, and diffusing the transmitted light over a wide area.

Further objects of this invention are to provide a translucent screen composed of starch particles dispersed in a polymeric binder, and to provide self-supporting translucent screens of this character.

Other objects of this invention will in part be obvious and will in part appear hereinafter.

The invention accordingly comprises the several steps and the relation of one or more of such steps with respect to each other of the others, and the article possessing the features, properties, and the relation of elements which are exemplified in the following detailed disclosure, and the scope of the application of which will be indicated in the claims.

U.S. Pat. Nos. 2,180,113 issued Nov. 14, 1939, and 2,287,556 issued June 23, 1942, both in the name of Edwin H. Land, describe translucent screens comprising one transparent medium forming a continuous phase and a second transparent medium in the form of minute, substantially colorless, discrete particles distributed throughout said first medium as a discontinuous phase, each medium having an index of refraction greater than that of air, the difference between the indices of refraction of said first and second media being small, said particles having non-planar and non-parallel surfaces and an overall diameter greater than one micron, whereby the ratio of refracted to reflected light at the interfaces between said media is high. As described in said U.S. Pat. No. 2,287,556, a particularly effective translucent screen comprises particles of globules of benzyl cellulose in ethyl cellulose. Benzyl cellulose is not commercially available, and it is highly desirable to provide a translucent screen of similar or superior properties.

It has now been found that highly efficient translucent screens may be obtained by forming a dispersion of starch particles in a solution of an organic polymer of appropriate index of refraction, and forming a film from this dispersion. The starch particles should have a diameter not greater than about 15 microns. A particularly useful starch is rice starch, preferably rice starch having a diameter of about 2 to 8 microns.

The polymeric dispersion of starch particles may be in the form of a film or a sheet of any desired thickness, for example, from 0.002 to 0.004 inch or thicker. Such a film may be self-supporting, or it may have a supporting sheet of glass or plastic on either or both sides. The film may be formed by casting, extruding, flowing, pouring, or spraying a solution of the polymer containing the dispersed starch particles. One preferred method of forming the film is to cast the dispersion upon a glass or other flat surface. Upon evaporation of the solvent, the desired dispersion of starch particles in polymer is produced. When dry, the film may be stripped from the surface upon which it was cast.

As examples of suitable polymers, mention may be made of ethyl cellulose, cellulose acetate, polymethyl methacrylate and similar polymers.

EXAMPLE

A translucent screen was prepared by mixing 2.2 g. of rice starch particles with 10 g. of ethyl cellulose (Dow Chemical Co., 100 centipoise), and adding this mixture, with stirring, to a hot mixture of 60 cc of toluene and 40 cc of ethyl alcohol 2B. A layer 0.035-inch thick of this dispersion was cast on a glass plate, using an 8-inch doctor blade. The solvents were evaporated off to give a milky white, translucent film having a thickness of 0.0032 to 0.0035 inch. This film was stripped off the glass plate to provide a self-supporting film. (The rice starch was catalogue No. 102955 available from ICN Pharmaceuticals, Life Sciences Group, Cleveland, Ohio, and had a particle size diameter range of about 2 to 8 microns, as measured by photomicrography. It is not necessary that the solvent mixture be hot, but the use of heat increases the rate at which the ethyl cellulose dissolves.)

The translucent screen prepared in the above example was used as the projection screen in a rear projection viewer of the general type shown in U.S. Pat. No. 3,851,954 issued Dec. 3, 1974. Very even illumination without hot spots was obtained, and the projected image was brilliant without loss of color saturation in a high ambient lightviewing situation. In addition, a high-quality projected image was viewable with very little if any loss of quality over a very wide viewing angle, both horizontal and vertical.

When placed between a light polarizer and a rotatable analyzer, the rice starch/ethyl cellulose translucent screen prepared in the above example was found to partially depolarize light, although the degree of depolarization was much less than might have been predicted. In contrast, the translucent screens of the above-noted patents, e.g., benzyl cellulose dispersed in ethyl cellulose, exhibit substantially no depolarization of light.

The concentration of the starch particles may vary over a considerable range, provided the translucent screen is substantially uniform to eliminate hot spots in viewing. In the above example, the rice starch concentration was approximately 22% by weight and gave highly satisfactory results. If a thicker screen is made, the rice starch concentration may be reduced to obtain a similar translucency. Accordingly, the appropriate concentration of starch particles may be readily determined for a particular projection intensity.

It is within the scope of this invention to form the translucent screen with one or both surfaces being non-planar. Thus, a translucent Fresnel lens of the general type shown in the rear projection screens described in U.S. Pat. No. 3,740,127 issued June 19, 1973 to Phillip G. Baker, Stewart Bennett and Richard W. Young and in U.S. Pat. No. 3,848,980 issued Nov. 19, 1974 to William T. Plummer, was prepared by molding polymethyl methacrylate having the above-described rice starch particles dispersed therein.

The particular polymer employed is selected to satisfy the particular hardness, flexibility, etc., requirements of the intended use. Ethyl cellulose is preferred over cellulose acetate in the above-described viewer because it exhibits greater resistance to physical damage. Rice starch is reported to have an index of refraction of about 1.53. A most suitable index difference between the starch and the polymer is about 0.04; however, satisfactory screens can be made with greater index differences providing the concentration of starch particles per unit area is decreased with increased differences in index.

In certain applications, it may be desirable to have an anti-reflection coating on one or both surfaces of the translucent screen. Suitable anti-reflection coatings are well known in the art and need not be described here.

In one embodiment of the invention, the translucent screen includes a very small quantity of a neutral light-absorbing material such as carbon black or a neutral mixture of dyes. The presence of this light-absorbing material will greatly reduce sideways loss of contrast, by scattered light, of the image projected on the screen with essentially negligible tinting of the white screen.

Since certain changes may be made in the about products and processes without departing from the scope of the invention herein involved, it is intended that all matter contained in the above description shall be interpreted as illustrative and not in a limiting sense.

What is claimed is:

1. A translucent screen consisting essentially of a dispersion of rice starch particles as a discontinuous phase in a polymeric continuous phase, said starch particles having non-planar and non-parallel surfaces and having overall diameters not exceeding about 15 microns.

2. A translucent screen as defined in claim 1 wherein the difference between the index of refraction of said polymeric continuous phase and the index of refraction of said starch particles is about 0.04.

3. A translucent screen as defined in claim 1 wherein said starch particles have a diameter of about 2 to 8 microns.

4. A translucent screen as defined in claim 1 wherein said polymeric continuous phase is ethyl cellulose.

5. A translucent screen as defined in claim 1 wherein said polymeric continuous phase is cellulose acetate.

6. A translucent screen as defined in claim 1 wherein said polymeric continuous phase is polymethyl methacrylate.

7. A translucent screen as defined in claim 1 wherein said starch particles are rice starch particles having a diameter of about 2 to 8 microns and said polymeric continuous phase is ethyl cellulose.

8. A translucent screen as defined in claim 1, wherein the surfaces of said screen are substantially flat and parallel.

9. A translucent screen as defined in claim 8 wherein at least one of said surfaces carries an antireflection coating.

10. A translucent screen as defined in claim 9 having the configuration of a Fresnel lens.

11. A translucent screen as defined in claim 1 including a small quantity of a light-absorbing material.

12. A translucent screen as defined in claim 11 wherein said light-absorbing material is carbon black.

* * * * *